(12) United States Patent
Tseng

(10) Patent No.: US 7,255,462 B2
(45) Date of Patent: Aug. 14, 2007

(54) DIMMER DEVICE FOR BACKLIGHT MODULE

(75) Inventor: Wen-Pao Tseng, Yangmei Taoyuan (TW)

(73) Assignee: K-Bridge Electronics Co., Ltd., Yangmei Taoyuan (TW)

( * ) Notice: Subject to any disclaimer, the term of this patent is extended or adjusted under 35 U.S.C. 154(b) by 112 days.

(21) Appl. No.: 10/791,737

(22) Filed: Mar. 4, 2004

(65) Prior Publication Data
US 2005/0195619 A1    Sep. 8, 2005

(51) Int. Cl.
*F21V 7/04* (2006.01)

(52) U.S. Cl. .................. 362/330; 362/561; 362/308; 362/328

(58) Field of Classification Search ........ 362/611–614, 362/617–629, 235, 241–248, 296–303, 306–311, 362/326–334, 347–351, 355, 356, 558, 561; 385/901
See application file for complete search history.

(56) References Cited

U.S. PATENT DOCUMENTS

| | | | | |
|---|---|---|---|---|
| 5,064,276 A | * | 11/1991 | Endo et al. ............ | 362/613 |
| 5,944,405 A | * | 8/1999 | Takeuchi et al. ......... | 362/617 |
| 6,336,728 B1 | * | 1/2002 | Deloy ..................... | 362/614 |
| 6,491,411 B2 | * | 12/2002 | Itoh ........................ | 362/246 |
| 6,580,476 B2 | * | 6/2003 | Hasegawa ................ | 349/58 |
| 6,590,626 B1 | * | 7/2003 | Suzuki et al. ............ | 349/70 |
| 6,692,137 B2 | * | 2/2004 | Blanchard ................ | 362/241 |
| 6,752,505 B2 | * | 6/2004 | Parker et al. ............. | 362/627 |
| 6,857,759 B2 | * | 2/2005 | Lee et al. ................ | 362/225 |
| 6,870,525 B2 | * | 3/2005 | Kawabata et al. ........ | 345/102 |
| 6,902,300 B2 | * | 6/2005 | Lee ........................ | 362/306 |
| 2005/0073858 A1 | * | 4/2005 | Kim et al. ............... | 362/561 |

* cited by examiner

*Primary Examiner*—Sandra O'Shea
*Assistant Examiner*—Bao Q. Truong
(74) *Attorney, Agent, or Firm*—Troxell Law Office, PLLC

(57) ABSTRACT

At least one light distribution device is provided in the spacing between adjacent light sources to allow light diffused from both sides of the light sources to be properly refracted and reflect so as to more evenly diffuse light toward a diffuser plate and thereby, eliminate the dark bands between adjacent light sources for effectively solving the bright bands and dark bands problem observed in prior art LCD modules.

17 Claims, 9 Drawing Sheets

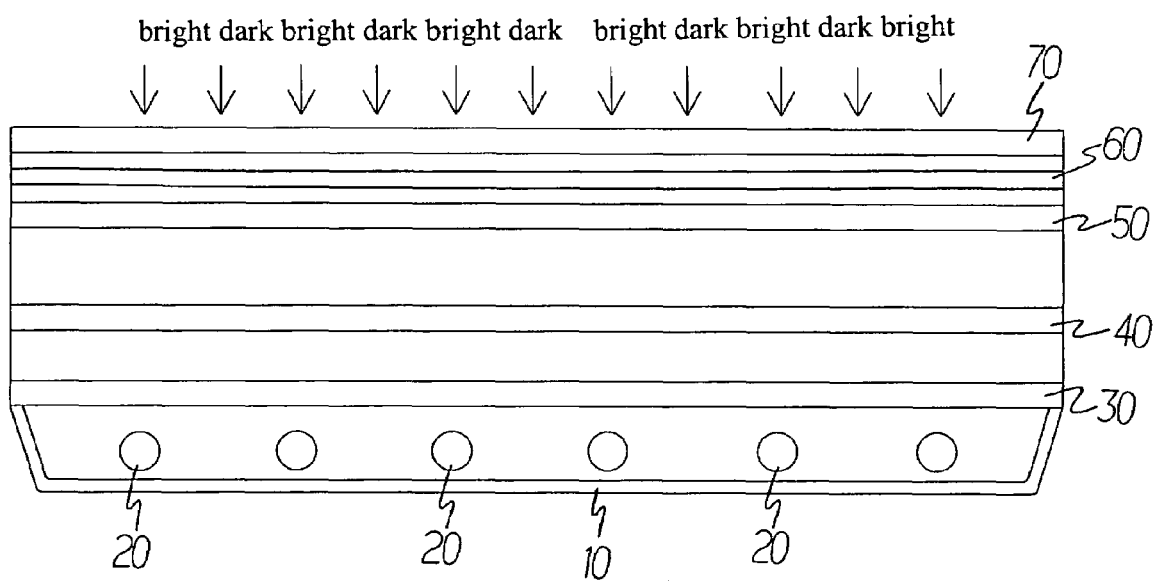
FIG.1.A
Prior Art

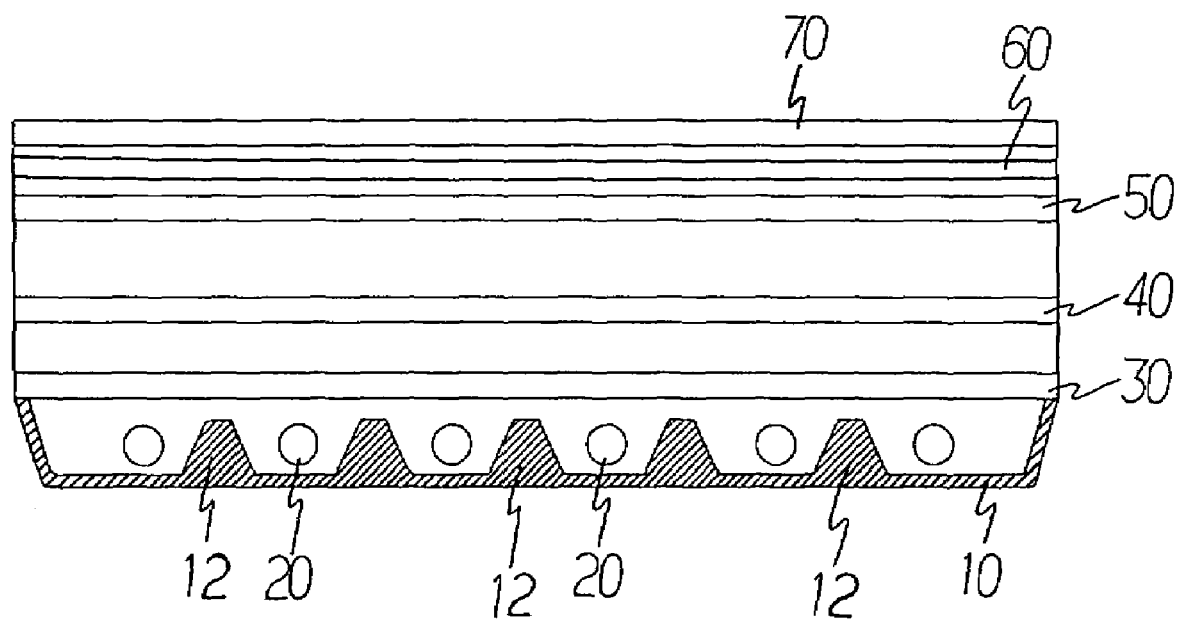
FIG.1 .B
Prior Art

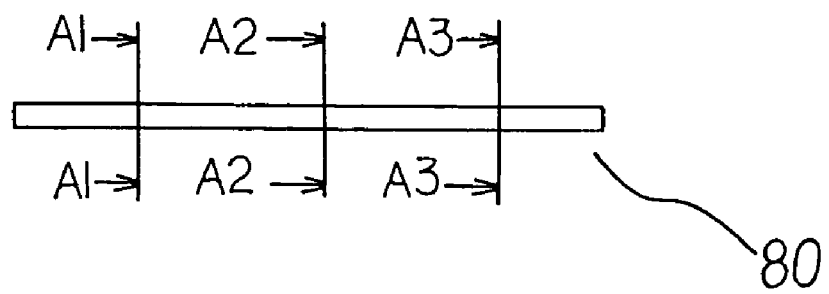
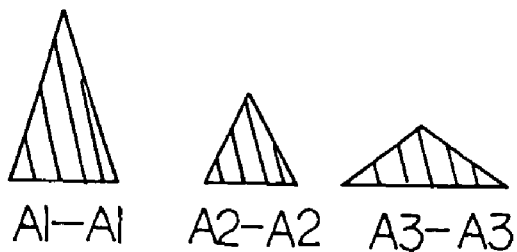
FIG.8 .A
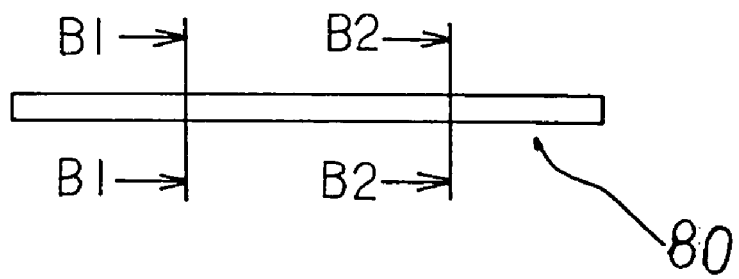
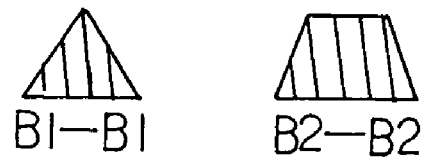
FIG.8 .B

DIMMER DEVICE FOR BACKLIGHT MODULE

BACKGROUND OF THE INVENTION (a) Field of the Invention

The present invention is related to an improved structure of a backlight module light distributing device, and more particularly to one that effectively light from light sources without developing bright bands and dark bands.

(b) Description of the Prior Art

As illustrated in FIG. 1 (A) of the accompanying drawings for an improved structure of a LCD backlight module of the prior art, the backlight module is essentially comprised of a reflector mask 10, multiple light sources 20, a diffuser plate 30, a lower diffuser sheet 40, a prism 50, a reflective polarizing sheet or an upper diffuser sheet 60 and a LCD 70 arranged in sequence from inside out. Wherein, those light sources 20 may be each a light tube in a stripe, U-shape or other continuous curve. The light sources 20 may be arranged at a proper spacing between the reflector mask 10 and the diffuser plate 30 and the light emitted by each of the light sources 20 provides the display effects on the LCD module. As generally found available in the market, multiple optical films disposed between the diffuser 30 and the LCD module may be comprised of 1-3 diffuser sheets, 0-2 brightness enhancement films and one reflective polarizing sheet for the purpose of diffusing the light passing through those optical films so as to correct the phenomena of bright bands and dark bands forming on the LCD module due to the absence of light emitted from the space between adjacent light sources.

Whereas the diffuser plate 30 functions only to help achieve the even diffusion for lights passing through it, it has a limited efficiency in correcting the phenomenon of the bright bands and the dark bands observed on the LCD module. To address this, an improvement is made for certain backlight modules by extending the distance between those light sources 20 and the diffuser plate 30 in order to increase the areas of the diffuser plate 30 illuminated by the light source 20 to effectuate greater dispersion of the light entering the diffuser plate 30 to thereby achieve the purpose of reducing the dark bands. However, the structural design for such an improvement not only provides limited effects but also causes the backlight module to be thicker thereby making the LCD module too large.

Furthermore, some other backlight modules seek to provide extinction (dispersion) on the surface of the diffuser plate by printing on the diffuser plate with ink containing $SiO_2$ or $TiO_2$ to achieve the purpose of reducing the dark band. Again, this extinction process not only increases the production cost of the diffuser and the complexity of the manufacturing process, but also only provides a passive solution to reduce the dark bands on the LCD since the extinction is created only after the light lands on the surface of the diffuser.

Further improvement as illustrated in FIG. 1(B), multiple light distributing devices 12 are provided on the reflector mask 10 of the backlight module. The highly reflective surface of the light distributing device 12 reflects the light emitted from the light source 20 to eliminate the dark band between any abutted light sources 20. However, the light distributing 12 integrated with the reflector mask 10 functions only for the purpose of reflective distribution and fails to provide a refractive or diffusive distribution function.

SUMMARY OF THE INVENTION

The primary purpose of the present invention is to provide an improved structure of a light distributing device to actively and effectively solve the problems of the significant bright bands and dark bands observed with the LCD module of the prior art to more effectively distribute the lights emitted form the light sources. To achieve this purpose, one or more light distributing devices are disposed between the spaced light sources to evenly diffuse the light diffused from both sides of the light sources towards the diffuser plate after having been properly refracted and reflected, to thereby eliminate the dark bands between any abutted light sources.

BRIEF DESCRIPTION OF THE DRAWINGS

FIG. 1 (A) is a sectional view of the structure of a backlight module of the prior art.

FIG. 1 (B) is a sectional view of the structure of another backlight module of the prior art.

FIG. 8 (A) is a sectional view of a backlight module of a seventh preferred embodiment of the present invention.

FIG. 8 (B) is a sectional view of a backlight module of an eighth preferred embodiment of the present invention.

DETAILED DESCRIPTION OF THE PREFERRED EMBODIMENTS

Figure 2:
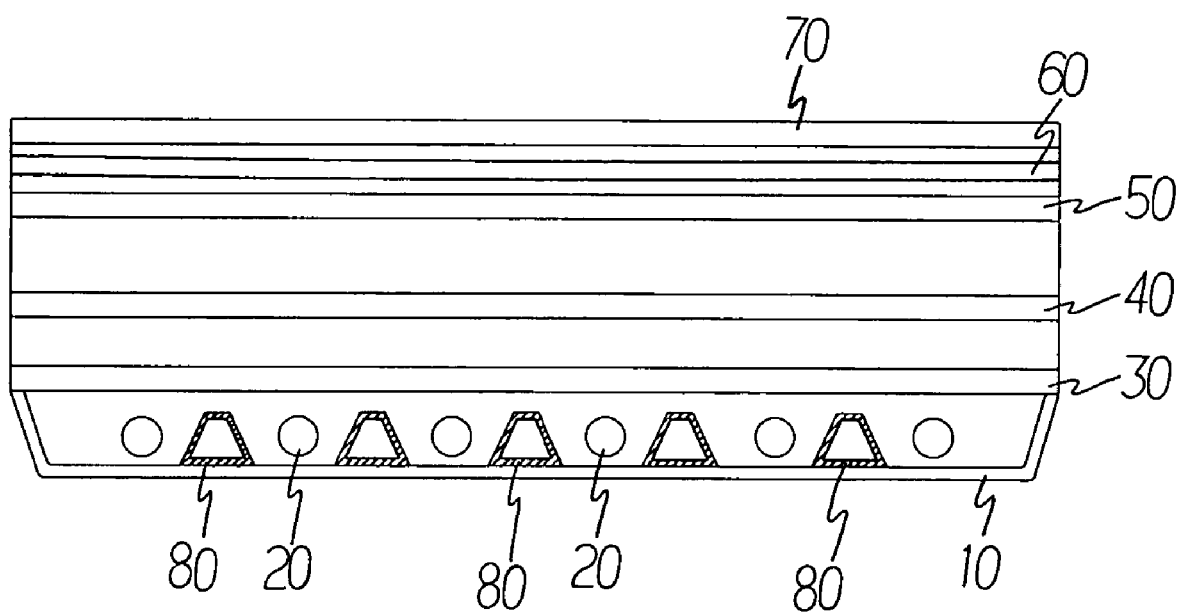
FIG. 2 is a sectional view of a backlight module of a first preferred embodiment of the present invention.

Referring to FIG. 2, a first preferred embodiment of the present invention is a backlight module having a reflector mask 10, multiple light sources 20, and multiple optical films including a diffuser plate 30, a lower diffuser sheet 40, a prism 50, a reflective polarizing sheet or an upper diffuser 60 in combination with a LCD 70 arranged in sequence from inside out. Wherein, those light sources 20 may be each a light tube in a stripe, U-shape or other continuously curved space. The light sources 20 are preferably arranged at a proper spacing between the reflector mask 10 and the lower diffuser sheet and the light emitted by each of those light sources 20 provide the display effects on the LCD.

Figure 3:
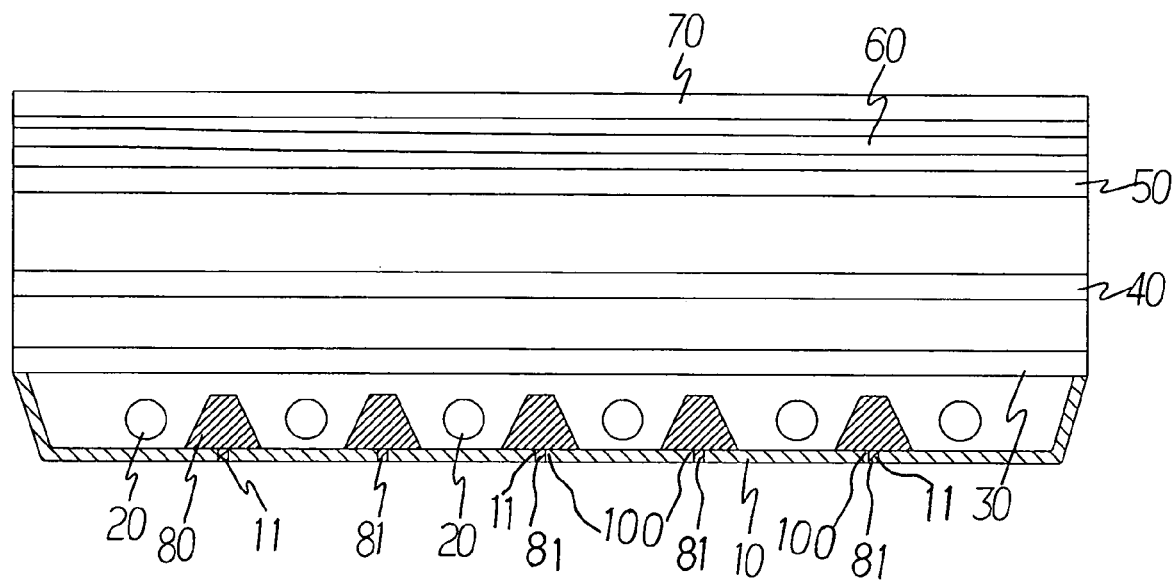
FIG. 3 is a sectional view of a backlight module of a second preferred embodiment of the present invention.
Figure 4:
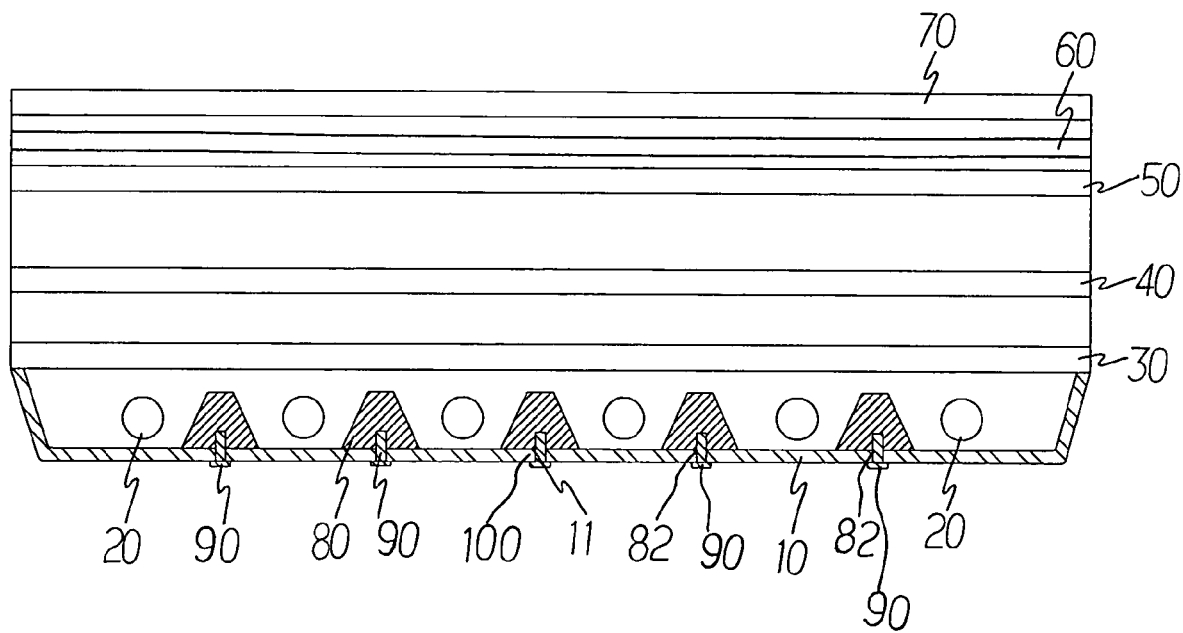
FIG. 4 is a sectional view of a backlight module of a third preferred embodiment of the present invention.

One or more than one solid or hollow light distributing device 80 is provided in the space between adjacent light sources 20. In a first preferred embodiment of the present invention as illustrated in FIG. 2, the light distributing device 80 is made in a structure bonded to the reflector mask 10, or in a second preferred embodiment as illustrated in FIG. 3, an insertion mechanism 100 is provided on the light distributing device 80 to allow incorporation into either the reflector mask 10 or the mechanism below the reflector mask 10 for the light distributing device so that the dimmer device is firmly secured in a proper position on the reflector mask 10. The insertion mechanism 100 is provided with a locking pin 81 under the light distributing device 80 in order to bond the dimmer device to the reflector mask 10 while a locking hole 11 is provided in the reflector mask 10 in relation to the respectively locking pin 81 for the light distributing device 80 so that the dimmer device 80 can be locked to the reflector mask 10. Alternatively, an insertion member may be separately provided to lock the light distributing device 80 and the reflector mask 10 by means of adhesion, insertion or a screw. As illustrated in FIG. 4 for a third preferred embodiment, the insertion mechanism 100 is disposed with a threaded hole 82 underlying where the light distributing device 80 is bonded to the reflector mask 10 while the locking hole 11 is provided on the reflective mask 10 to permit the insertion of a screw 90 to fasten the light distributing device 80 to either the reflector mask 10 or the mechanism below the reflector mask 10.

Whereas the light distributing device 80 of the present invention is provided between any adjacent light sources 20, the light diffused (from both sides of the light source) passing through is properly refracted and reflected by the light distributing device 80 before being evenly diffused towards the diffuser plate 30 to provide an active means of eliminating the dark bands created between adjacent sources for more effectively distributing light emitted from the light source.

The light distributing device 80 may be made of plastic materials including but not limited to Polycarbonate (PC), or Polymethyl methacrylate (PMMA), or Polyethylene Terephthalate (PET) in a white or transparent stick structure, or made of transparent plastic materials, e.g. PC or PMMA added with diffusion agent (such as $SiO_2$ or $TiO_2$) in a white mat stick structure so to produce the light distributing device 80 with various refraction effects to allow the selection of the proper light distributing device 80 depending on the spacing between the backlight module and the light sources 20.

Figure 5:
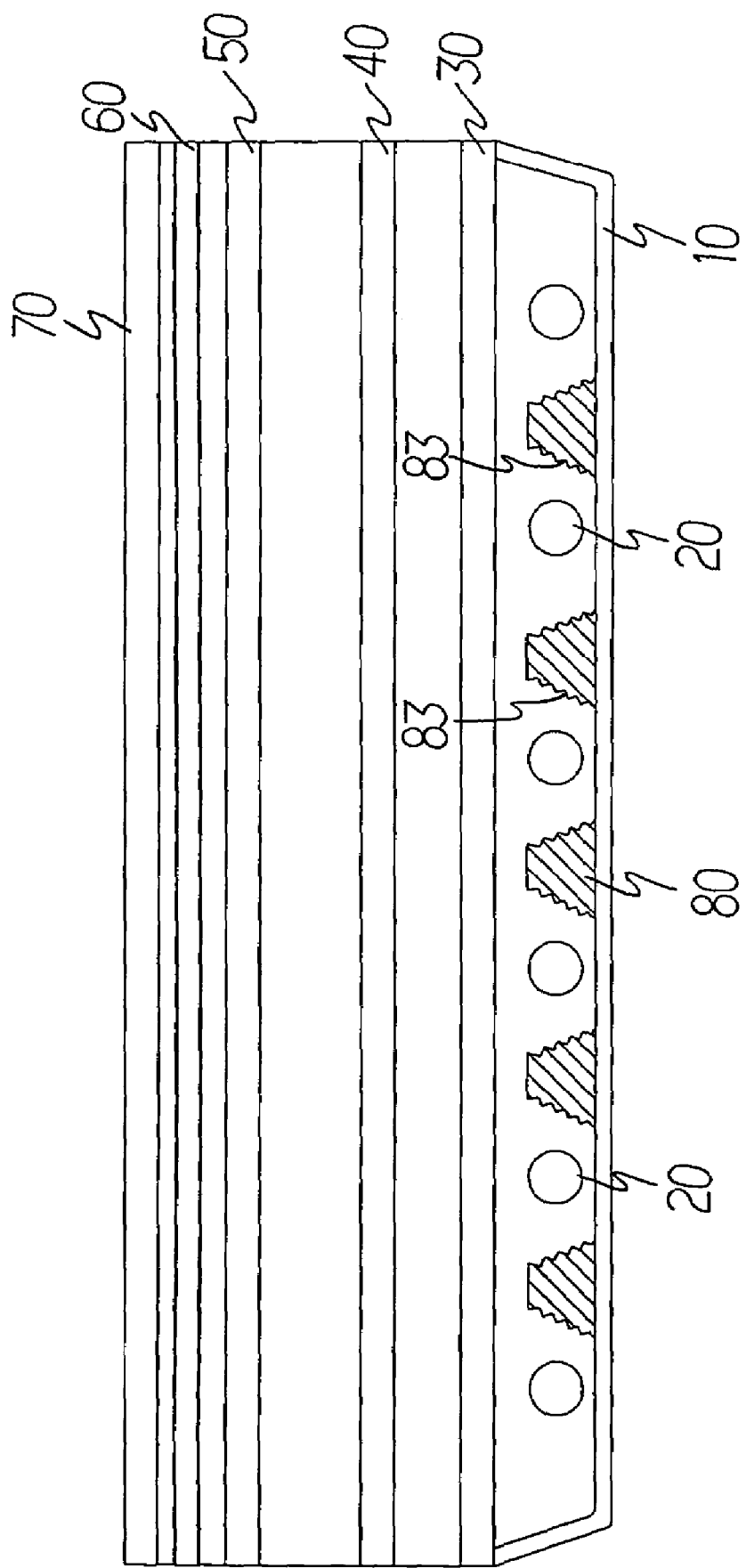
FIG. 5 is a sectional view of a backlight module of a fourth preferred embodiment of the present invention.
Figure 6:
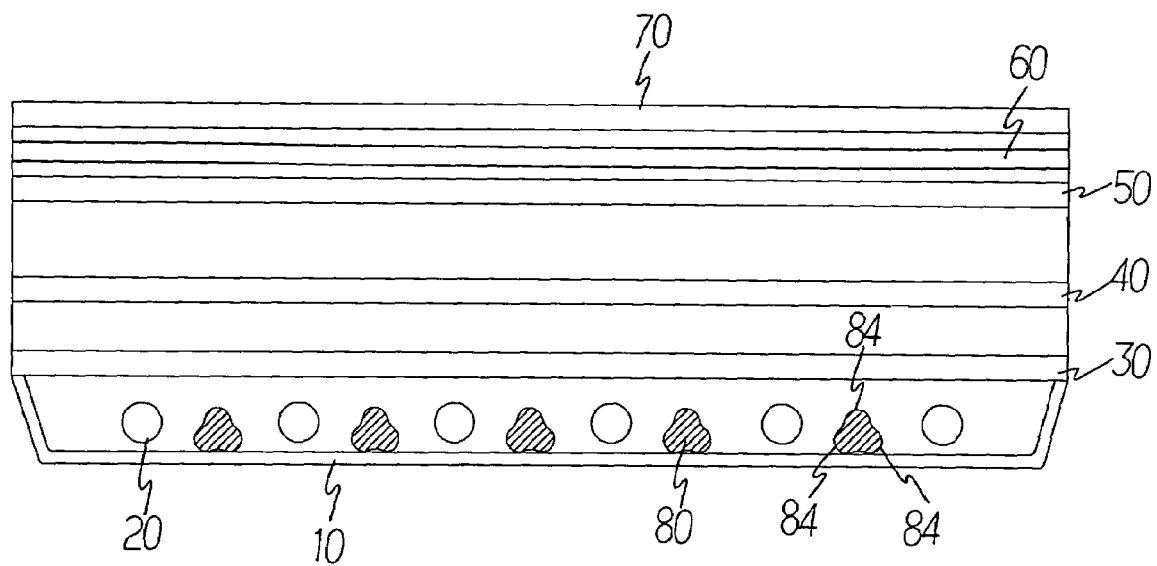
FIG. 6 is a sectional view of a backlight module of a fifth preferred embodiment of the present invention.
Figure 7:
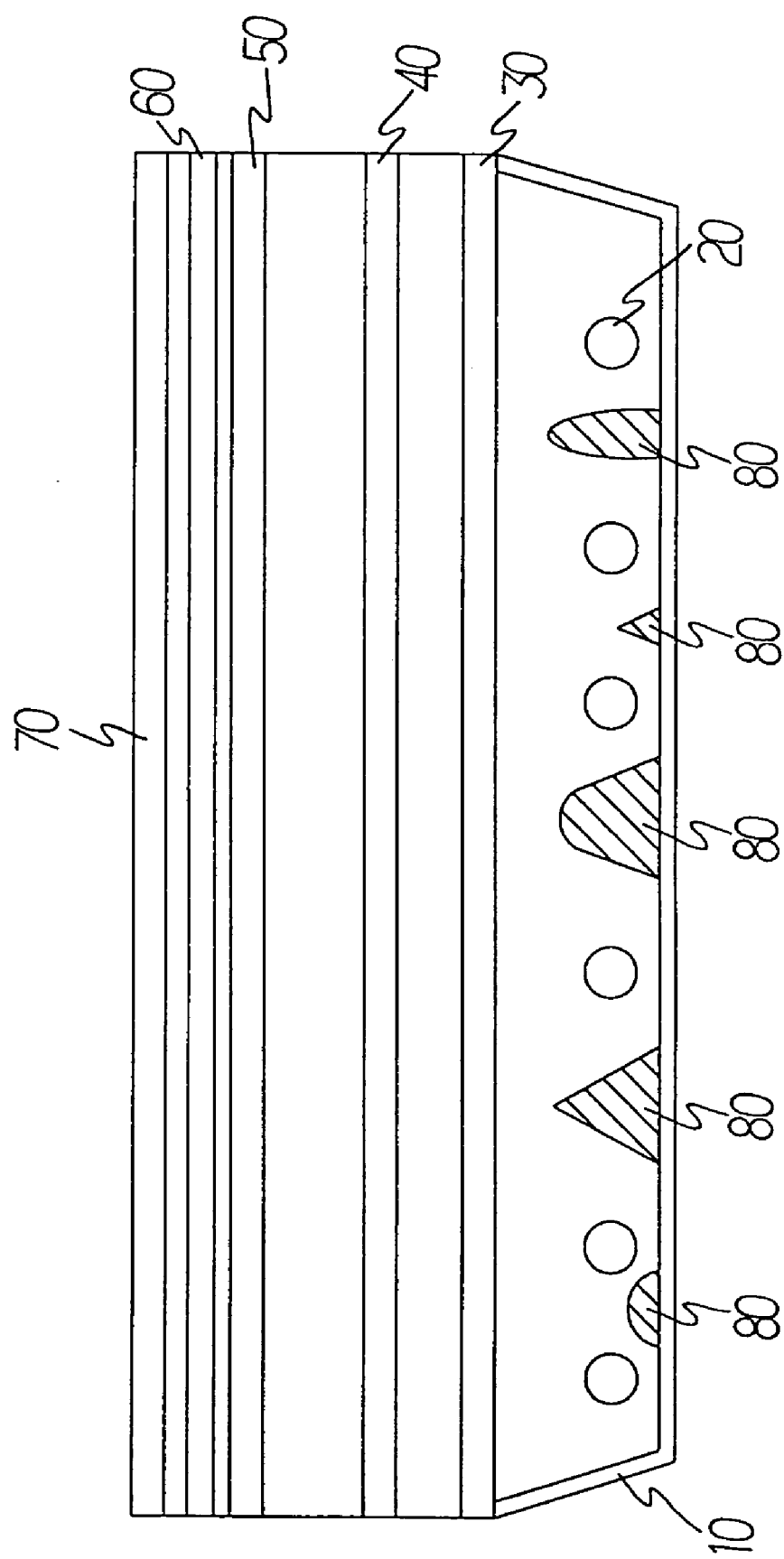
FIG. 7 is a sectional view of a backlight module of a sixth preferred embodiment of the present invention.

Now referring to FIG. 5 for a fourth preferred embodiment of the present invention, wherein, at least one surface of the light distributing light device 80 is locally or entirely distributed with embossment 83 in a form of V-, U-, or C-shaped cut, or multiple straight lines or curves or combination of both on the surface facing the lower diffuser plate 30 and the light source 20; or as illustrated in FIG. 6 for a fifth preferred embodiment of the present invention, wherein, multiple convex surfaces in various curvatures 84 are disposed. The light distributing device 80 is formed by a different convex or flat surface for the embossment 83 or the convex surface to create a light converging effect. Alternatively, as illustrated in FIG. 7 for a sixth preferred embodiment of the present invention, various changes in the shape and the distance of the arrangement are employed depending on the size of the light sources 20 or the length of the spacing between adjacent light sources 20. The shape of the light distributing device 80 varies depending on the angle of the disposition of the light sources 20 as illustrated in FIGS. 8(A) and 8(B) respectively showing a seventh and an eighth preferred embodiments of the present invention; wherein, either the appearance, size or shape of the light distributing devices 80 is changed so that the light emitted form the light source 20 can be diffused from the embossment 83 or the convex surface 84 on the diffuser plate 30 to more effectively solve the problem of the significant bright bands and dark bands of the LCD modules from the prior art. Alternatively, the same effects can be achieved by having at least one surface of the light distributing device 80 locally or entirely matted, or printed with ink, or distributed with concave and convex points in either round, rectangular, diamond or polygonal form.

The present invention provides an improved structure of a light distributing device for a LCD module and this application is duly filed for a utility patent. It should be noted that the specification and drawings illustrate the preferred embodiments of the present invention and do not in any way limit the present invention. Therefore, any structure, device, and/or characteristics similar or equivalent to that of the present invention shall be deemed as falling within the scope of the purpose and the claims of the present invention.

I claim:

1. An improved light distribution device for a backlight module comprising:
   a reflector mask;
   multiple light sources located above the reflector mask;
   multiple optical films, including a diffuser plate, located above the light sources;
   a liquid crystal display (LCD) located above the optical films, wherein each light source is spaced apart from an adjacent light source;
   at least one light distribution device located on an upper surface of the reflector mask, the at least one light distribution device being located in the space between adjacent light sources, the light distribution device being configured to both refract and diffuse light originating from the light sources towards the diffuser plate, wherein the light distribution device is formed as a solid stick structure.

2. The improved light distribution device as claimed in claim 1, wherein, the light distribution device in formed in the shape of an elongated stick adhered to the reflector mask.

3. The improved light distribution device as claimed in claim 1, further comprising an insertion mechanism for attaching the light distribution device to the reflector mask or a mechanism provided below the reflector mask.

4. The improved light distribution device as claimed in claim 1, wherein, at least one surface of the light distribution device is embossed.

5. The improved light distribution device as claimed in claim 1, wherein, the form of the embossment is selected from the group consisting of at least one straight line, a curve, a V-shaped cut, U-shaped cut, or C-shaped cut.

6. The improved light distribution device as claimed in claim 1, at least one surface of the light distribution device is provided with multiple convex surfaces in various curvatures.

7. The improved light distribution device as claimed in claim 1, the light distribution device being formed as a transparent stick structure.

8. The improved light distribution device as claimed in claim 1, the light distribution device being formed as a white stick structure.

9. The improved light distribution device as claimed in claim 1, the light distribution device being formed as a matted stick structure.

10. The improved light distribution device as claimed in claim 1, wherein, the optical films are comprised of a lower diffuser sheet, a prism and a reflective polarizing sheet.

11. The improved light distribution device as claimed in claim 1, wherein, the optical films are comprised of 1-3 diffuser sheets, 0-2 brightness enhancement films, and 0-1 reflective polarizing sheet.

12. The improved light distribution device as claimed in claim 1, wherein, the light distribution device is made of Polycarbonate (PC), or Polymethyl methacrylate (PMMA), or Polyethylene Terephthalate (PET) into a transparent stick structure.

13. The improved light distribution device as claimed in claim 1, wherein, the light distribution device is formed in a white stick structure, the light distribution device made from a material selected from a group consisting of Polycarbonate (PC), Polymethyl methacrylate (PMMA), or Polyethylene Terephthalate (PET).

14. The improved light distribution device as claimed in claim 1, wherein, the light distribution device is made of transparent plastic materials in combination with a diffusion agent to form a matted stick structure.

15. The improved light distribution device as claimed in claim 14, wherein the transparent plastic material is Polycarbonate (PC) or Polymethyl methacrylate (PMMA).

16. The improved light distribution device as claimed in claim 1, wherein at least one surface of the light distribution device is angular.

17. The improved light distribution device as claimed in claim 1, wherein at least one surface of the light distribution device is curved.

* * * * *